United States Patent [19]
Wihsmann et al.

[11] Patent Number: 6,086,998
[45] Date of Patent: Jul. 11, 2000

[54] NON-INFLAMMABLE FIBER PRODUCT

[75] Inventors: Marc Wihsmann, Berlin; Lothar Ebner, Oranienburg, both of Germany

[73] Assignee: Protekum Umweltinstitut GmbH Oranienburg, Oranienburg, Germany

[21] Appl. No.: 09/331,388

[22] PCT Filed: Dec. 22, 1997

[86] PCT No.: PCT/DE97/03031

§ 371 Date: Jun. 18, 1999

§ 102(e) Date: Jun. 18, 1999

[87] PCT Pub. No.: WO98/28562

PCT Pub. Date: Jul. 2, 1998

[30] Foreign Application Priority Data

Dec. 23, 1996 [DE] Germany .................. 196 54 836
Dec. 23, 1996 [DE] Germany .................. 296 22 593 U

[51] Int. Cl.⁷ ...................................... C09K 3/28
[52] U.S. Cl. ............... 428/372; 428/359; 428/361; 428/372; 428/402; 252/62; 252/607; 252/921; 427/308; 427/427; 162/158
[58] Field of Search ................. 428/357, 359, 428/361, 372, 402; 252/62, 607, 921; 427/308, 427; 162/158

[56] References Cited

U.S. PATENT DOCUMENTS 4,184,969  1/1980  Bhat .
4,702,861  10/1987  Farnum .

FOREIGN PATENT DOCUMENTS 2 150 600  12/1996  Canada .
0 322 287   6/1989  European Pat. Off. .
33 16 197  11/1984  Germany .
683 543   of 0000  Switzerland .

OTHER PUBLICATIONS

Prof. Dr. Jürgen Falbe und Prof. Dr. Manfred Regitz: RÖMPP, 9th Edition, pp. 1369–1370.

Primary Examiner—Richard Weisberger
Attorney, Agent, or Firm—Collard & Roe, P.C.

[57] ABSTRACT

The invention relates to a non-inflammable fiber product that can be used as flame-resistant material or insulating material or both. The invention seeks to provide a material made of used cellulose or cellulose-containing refuse, which had not been sensibly used hitherto. The new fiber product consists of 30 to 97 wt. % cellulose-containing fiber or a cellulose-containing fiber mixture; 0.01 to 1 wt. % nonionic surface active agent; 1 to 5 wt. % aluminum oxide finely distributed on and in the fibers, and 0 to 68 wt. % filling material, as well as optionally one or more additional biocides. Said product can be processed in bulk or as pressed plate.

14 Claims, No Drawings

NON-INFLAMMABLE FIBER PRODUCT

This invention concerns a nonflammable fiber product which can be used as a flame-retardant material or as an insulating material or as a material suitable for both purposes.

There are already numerous known thermal insulation materials based on cellulose for blowing into the cavities in walls, roofs and ceilings, forming an insulation layer with good thermal insulation properties, regardless of how it is formed. These materials consist essentially of paper products and recycled paper products (approximately 85%) and are mixed with borax, boric acid and aluminum hydroxide as aggregates for fire prevention and to protect against fungus infections and other pests. The thermal conductivity of these materials is on the order of 0.045 W/mK.

Canadian Patent No. 2,150,600 A describes a flame-retardant material of organic or inorganic fibers containing sodium/potassium silicates, surface-active agents and heat-expanding microbeads. U.S. Pat. No. 4,184,969 A describes an inorganic composition as an additive to cellulose fibers, consisting of aluminum oxide trihydrate, ammonium sulfate, borax and boric acid.

Other materials in the form of boards or layers with a similar thermal conductivity based on recycled paper from newspapers, for example, are likewise known and are available commercially.

In addition, Swiss Patent No. 683,543 describes an insulation material based on virgin wool, which provides both sound and heat insulation.

However these known properties use valuable resources, in these cases recycled paper and wool, which could definitely be reused in the paper and textile producing industries and for which there is a high demand, so they are thus removed from their highest-quality utilization.

In addition, boric acids and the salts thereof are used in substantial quantities (up to 15% by weight) for a biocidal finish, although these compounds cannot be classified as ecologically safe.

Furthermore, phosphates such as ammonium phosphate or zinc borate, aluminum oxide hydrate, halogenated organic compounds and halogenated organic phosphorus compounds in particular have also been used as substances for a flame-retardant finish, and for, coatings that provide an oxygen barrier are also applied to reduce smouldering (Römpp, 9th edition, pp. 1369–1370).

The object of this invention is to develop a nonflammable boron-free product which preferably also provides thermal insulation and uses recycled materials that are as inexpensive as possible or substances that can no longer be recycled otherwise. A special object of this invention is to find an appropriate use within the cycle of processable celluloses for waste products containing cellulose which would have been incinerated in the past.

According to this invention, this is accomplished by a nonflammable fiber product containing:
30 to 97 wt % of a fiber which contains cellulose or a fiber-mixture containing cellulose;
0.01 to 1 wt % of a nonionic surfactant;
1 to 5 wt % aluminum oxide distributed finely in and on the fiber; and
0 to 68 wt % fillers, each based on the total weight.

It is advantageous if the fiber product also contains 0.005 to 0.5 wt % of a biologically active, surface-active ingredient. The biologically active surface-active substance may be a cationic surfactant or a sparingly water-soluble cationic surfactant or a mixture thereof.

Preferred substances for use as nonionic surface-active agents (nonionic surfactants) include fatty alcohol ethoxylates, alkylphenyl ethoxylates, fatty amine ethoxylates, fatty acid ester ethoxylates, alcohol amides, sugar surfactants or amine oxides. Fatty alcohol ethoxylates such as those derived from $C_{16}/C_{18}$ alcohols with 16 to 20 ethoxy units are especially preferred.

If the nonionic surfactant content is less than 0.05%, an adequate flame resistance is not achieved (flame retardancy) and if the nonionic surfactant content is more than 1 wt %, no further improvement in performance is achieved, and this amount of surfactant is not economical. The fiber or fiber mixture containing cellulose is selected from pure processed cellulose, lignin-based wood structures such as compact wood, wood chips or wood pulp as well as bark, straw, flax, hemp, jute, coconut, cotton, recycled paper, other cellulose-based waste products and mixtures thereof. The other cellulose-based waste products also include those which cannot normally be processed further in paper making or wood pulp production because of their low cellulose content or for other reasons.

A preferred embodiment of this invention has a cellulose content of 50 to 97 wt %, especially preferably 70 to 97 wt %.

This invention also concerns a nonflammable fiber product comprising:
30 to 97 wt % of a cellulose-based fiber or a cellulose-based fiber mixture;
0.01 to 1 wt % of a nonionic surfactant;
1 to 5 wt % aluminum oxide distributed finely in and on the fiber; and
0 to 68 wt % fillers,
prepared by mixing an aqueous 1 to 15 wt % solution of aluminum hydroxide chloride containing 0.05 to 1 wt % of a nonionic surfactant with 25 to 97 wt % of a cellulose-based fiber or a cellulose-based fiber mixture and 0 to 68 wt % of a filler or filler mixture and then drying.

This invention also concerns a method of producing a nonflammable fiber product by mixing an aqueous 1 to 15 wt % solution of aluminum hydroxychloride containing 0.05 to 1 wt % of a nonionic surfactant with 30 to 97 wt % of a cellulose-based fiber or a cellulose-based fiber mixture and 0 to 68 wt % of a filler or filler mixture and then drying. The drying can be performed at ambient temperature up to approximately 150° C.

One particular embodiment of this invention concerns a nonflammable fiber product containing:
30 to 70 wt % cellulose fibers;
15 to 45 wt % calcium carbonate;
0.01 to 1 wt % cationic surfactant;
0.05 to 1 wt % biologically active, sparingly water-soluble surface-active ingredient or 0.25 to 6.5 wt % calcium peroxide; the remainder being fillers;
plus optionally one or more additional biocidal agents. This product expediently also contains 0.01 to 1 wt % of a nonionic surfactant.

In general, a single compound or a mixture may be used as the cationic surfactant. Those in which the nitrogen group is substituted with two long and two short alkyl groups are preferred, e.g. dodecyldimethylammonium chloride.

When cationic and nonionic surfactants are processed together in an advantageous fiber product according to this invention, the cationic surfactant is preferably added before the nonionic surfactant to make it easier to observe the elimination of the phase separation effect which would otherwise occur.

Examples of biologically active, sparingly water-soluble surface-active ingredients include thiuronium salts such as tetradecylthiuronium bromide, but mixtures are also possible. On the other hand, as already explained, calcium peroxide may also be used as a biologically active substance.

Examples of fillers include those from the group consisting of $Al_2O_3$, $SiO_2$, MgO, calcium silicate and aluminum silicate, $BaSO_4$, $Na_2CO_3$, KCl, $K_2CO_3$, $CaCO_3$, CaF, iron oxides and mixtures thereof.

Without attempting to be bound to a theory, presumably the combination of nonionic surfactants and aluminum hydroxychloride leads to a surprisingly fine distribution of the aluminum compound on the fiber and in all the fiber pores, so that the resulting aluminum oxide remains in and on the fiber after drying the fiber, the release of HCl and optionally the reaction of HCl with a filler such as $CaCO_3$; after this fiber is carbonized under the influence of flame, a non-smouldering structure of aluminum oxide remains behind.

It is especially noteworthy that even when a fiber product containing, for example, 70% cellulose fibers according to this invention is exposed to an open flame, the fibers still do not burn, but instead they merely undergo carbonization. This carbonization process comes to a standstill immediately after the ignition source is removed.

In this way, values for building material class B1 (flame-retardant building materials) according to DIN 4102 (May 1981) are reached with regard to the burning properties of building materials with relatively small amounts of aluminum oxide in a fiber product, e.g., at a fiber density of approximately 0.08 $t/m^3$ [sic; $g/m^3$]. Such a building material class is the maximum classification that can be achieved for flammable building materials and represents a definite improvement in comparison with the building materials processed with cellulose fibers in the past and their boron-based finish.

A building material meets the prerequisites of building materials class B1 when it passes the test in a fire shaft where the average residual length of each test object amounts to at least 15 cm, and no specimen has a residual length of zero, and furthermore, if the average flue gas temperature of 200° C. is not exceeded in any test and the specimens do not give any cause for objections after another spectrum of testing.

The nonflammable fiber product according to this invention may be used as a blowable thermal insulation material or as a molded article or it may also be used for production of insulating linings which also have a flame-retardant effect at the same time.

This material may optionally also be converted to a fine fibrous structure by foaming it first and then pulverizing the dry foam. In this form, it can be blown into cavities to function as an insulation material there. There is also the possibility of gluing the product in a moistened state to vertical walls, for example, to achieve a uniform lining effect.

A binder may also be present in an advantageous fiber product according to this invention, e.g. to guarantee better moldability to form boards or other molded articles. Suitable binders include phenol-formaldehyde resins, melamine resins, Mg/Ca lignate, tall oil resin, etc.

It is also possible to add the binder first before molding, but in this case the product will be processed further while still moist, although that is not absolutely necessary.

Another possibility for production of a bulk insulation material, in this case with a much higher density, consists of grinding the starting material, which has already been finished, and mixing the ground material with small quantities of cement, but depending on the process, either another fine fibrous blowable material is introduced, or a coarse-grained bulk granular material is also obtained and is introduced into cavities.

Finally, the granular starting mixture may also be conditioned with aqueous solutions and then chopped into fibers in a high-speed beater and cutter mill.

Good insulation properties are obtained. Depending on the compaction of the product, the thermal conductivity is in the range of approximately 0.04 to 0.07 W/mK. Values of approximately 0.05 W/mK are achieved at a density of approximately 0.2 $kg/dm^3$ and a layer thickness of approximately 25 mm.

In a specific embodiment of this invention, an essential component of the cationic surfactant or surfactant mixture is a formulation of cationic surfactants that produces the required foam stability but also guarantees that both the surfactant and the active ingredients contained in the mixture will be absorbed onto the fiber and will remain there as a stationary finish even and particularly after the drying operation. For extremely fine fibrous structures, a nonionic surfactant may also be used here in addition.

Therefore, this invention concerns the use of the fiber product described above as a blowable insulation material as well as concerning a material that can be molded under compression to form molded articles and a material for production of flame-retardant and thermally insulating linings such as wall panels, injection molded wall paper, etc. In addition, bound granules suitable for bulk thermal insulation and for providing thermal insulation and footfall insulation for floor coverings can also be produced from the basic fiber substance described above.

As insulation material, the fiber product may have a residual moisture content of approximately 5 to 12%. Subsequent moistening of the installed fiber product will not cause the finishing substances to be leached out or redistributed, as would be the case with the exclusive use of water-soluble ionic compounds (boric acid, borax, etc.). In contrast with that, the product remains essentially preserved in its original mas distribution.

This material has a stable volume above a minimum compaction (density=0.1) and it is safe from sedimentation.

The biocidal finish of the fiber product is improved by cationic surface-active agents such as dodecyldimethylammonium chloride or other active biocidal agents such as N,N-bis-(3-aminopropyl)-N-dodecylamine.

Sparingly water-soluble surface-active compounds such as thiuronium salts, e.g. tetradecylthiuronium bromide, have an especially good biological activity. Likewise, calcium peroxide may also be used. Additional biocidal agents include sparingly soluble basic copper compounds in a total amount of less than 1% of the material or formulations of cationic surfactants with cement.

The cellulose content is preferably in the range of 70 wt % to 97 wt % in the production of fiberboard and a starting material such as recycled paper which essentially has a high fiber content.

When using any other cellulose-based waste product with a lower cellulose content, the cellulose content is in the range of 25 wt % to 60 wt %, preferably 30 wt % to 40 wt %. With such a material, the advantage in the form of the fiber product according to this invention is especially obvious, because in this case cellulose that would otherwise completely leave the paper cycle, e.g. due to incineration, is recycled back into the paper cycle again here.

In addition to the above-mentioned fillers from the series consisting of aluminum oxide, silicon dioxide, magnesium oxide, sodium tetraborate, calcium and alumino silicates, barium sulfate, calcium carbonate sodium carbonate, potash, calcium fluoride and iron oxide as well as mixtures thereof, other known fillers may also be used if they do not have any negative effects on the thermal insulation and flame-retardancy properties.

It is especially advantageous for the product according to this invention that boric acid and the salts thereof such as sodium tetraborate, which must normally be present in larger quantities, are not necessary as a finishing material.

In addition, other cellulose-based waste products which cannot currently be processed further and are burdened with a strong odor surprisingly form an essentially odorless and fine fibrous structure after being mixed with calcium carbonate, cationic surfactants, sparingly soluble surface-active agents and fillers as well as optionally additional biocidal agents that are also available commercially, and this odorless, fine fibrous structure can be molded with no problem or, after drying, it can be blown. $Al_2O_3$ can also be regarded as a filler and can be introduced in the form of aluminum hydroxychloride, preferably together with a non-ionic surfactant.

Another advantageous embodiment of the insulation material according to this invention consists of using cement as the active substance in an amount of 5 wt % to 35 wt % instead of the biologically active, sparingly water-soluble surface-active ingredient or calcium peroxide.

This invention is explained in greater detail below on the basis of examples. All the percentage amounts given are to be understood as percent by weight (wt %).

EXAMPLE 1

Eight kg recycled paper fibers with a cellulose content of 45% were mixed with 297 g sodium carbonate ($Na_2CO_3$).

The starting material pretreated in this way was then wetted with 2.5 liters of a solution, which was a 7% solution of polyaluminum hydroxychloride ($Al_2O_3$ content in the end product=2.2%). The wetting was accomplished by intensive spraying, for example.

In addition, 0.16% of a fatty alcohol ethoxylate and 0.08% dodecyldimethylammonium chloride (content in the end product=0.05%) were also present.

When it was certain that all the fibers had been wetted by the solution, they were dehydrated in a chamber dryer within approximately one hour. The residual moisture content was approximately 10% of the total weight and had no effect on the properties of the bulk material. The product was obtained as a finely divided, fibrous product which could be used as a bulk insulation material or as a blown insulation material. The density to be established was set between 0.06 and 0.2 g/cm³, depending on the intended use, and the thermal conductivity was no higher than 0.045 W/mK. The resulting loose pakking was neither flammable nor would it smoulder after the ignition source had been removed.

EXAMPLE 2

Seven kg recycled paper fibers with a cellulose content of 45% and 1 kg jute fibers with a cellulose content of 64% (10% moisture) were mixed with 210 g slaked lime (Ca(OH)$_2$) and a binder.

The starting mixture pretreated in this way was wetted with three liters of a solution, which was a 6% solution of polyaluminum hydroxychloride ($Al_2O_3$ content in the end product=2.2%). In addition, 0.32% of a fatty alcohol ethoxylate and 0.12% dodecyldimethylammonium chloride (content in the end product 0.05%) were also present.

When it was certain that all the fibers had been wetted by the solution, the precise mass of the mixture was deter-mined. The mixture was adjusted to a final density of 0.08 g/cm³ in a compression mold, a binder was optionally added and the board was dried at 110° C. within 15 minutes. The resulting board was neither flammable nor smouldering after removal of the ignition source.

EXAMPLE 3

Ten kg pine wood fibers with a cellulose content of 42% were mixed with 459 g slaked lime (Ca(OH)$_2$) and a binder.

The starting material pretreated in this way was wetted with 2.7 liters of a solution, which was a 13% solution of polyaluminum hydroxychloride (final $Al_2O_3$ content of the product=3.5%). In addition, 0.8% of a fatty acid polyethylene glycol ester and 0.02% dodecyldimethylammonium chloride (content in the end product=0.015%) were also present. When it was certain that all the fibers were wetted by the solution, the precise mass of the fiber material was determined. A final density of 0.08 g/cm³ was established in a compression mold, and the board was dried at 110° C. within 15 minutes. The resulting board was neither flammable nor would it smoulder after the ignition source had been removed.

EXAMPLE 4

Ten kg shredded straw with a cellulose content of 32% were mixed with 340 g slaked lime (Ca(OH)$_2$) and a binder.

The starting mixture pretreated in this way was wetted with two liters of a solution, namely a 13% solution of polyaluminum hydroxychloride ($Al_2O_3$ content in the end product=2.6%). In addition, it also contained 3.5% of a fatty amine ethoxylate and 1.8% dodecyldimethylammonium chloride (content in the end product=0.5%). When it was certain that all the fibers had been wetted by the solution, the exact mass of the mixture was determined. A final density of 1 g/cm³ was established in a compression mold, and the board was dried at 110° C. within 15 minutes. The resulting board was neither flammable nor would it smoulder after the ignition source had been removed.

EXAMPLE 5

Five kg jute from used bags with a cellulose content of 64% were mixed with 5 kg hemp with a cellulose content of 67% and with 340 g slaked lime (Ca(OH)$_2$).

The starting mixture pretreated in this way was wetted with four liters of a solution, namely a 7% solution of polyaluminum hydroxychloride (final $Al_2O_3$ content in the product=2.6%). In addition, 0.05% of a fatty alcohol ethoxylate and 0.05% dodecyldimethylammonium chloride (content in the end product=0.02%) were present.

When it was certain that all the fibers had been wetted by the solution, they were dried at 60° C. The resulting fibers were neither flammable nor would they smoulder after the ignition source had been removed.

This result was especially interesting in the case of jute, which could hardly be extinguished in a fire in the past due to its tubular hollow fibers and the resulting good supply of oxygen to the end of the fiber.

EXAMPLE 6

Ten kg beech wood pulp with a cellulose content of 97% were wetted with three liters of a solution, which was a 17% solution of polyaluminum hydroxychloride ($Al_2O_3$ content in the end product 5%). In addition, it also contained 0.8% of a fatty alcohol ethoxylate. When it was certain that all the fibers had been wetted by the solution, they were dried at 50° C.

The resulting fibers were not flammable and they would not smoulder after the ignition source had been removed.

EXAMPLE 7

Ten kg cotton with a cellulose content of 82% were mixed with 340 g slaked lime ($Ca(OH)_2$).

The starting mixture pretreated in this way was wetted with four liters of a solution, which was a 7% solution of polyaluminum hydroxychloride (final $Al_2O_3$ content in the product=2.6%). In addition, it also contained 0.55% of a fatty alkanolamide polyethylene glycol ether and 0.05% dodecyldimethylammonium chloride (content in the end product=0.02%). When it was certain that all the fibers had been wetted by the solution, they were dried at 60° C. The resulting fibers were not flammable and would not smoulder after the ignition source had been removed.

EXAMPLE 8

Ten kg fir strips with a cellulose content of 42% were immersed in a 6% solution of polyaluminum hydroxychloride which also contained 0.32% of a fatty alcohol ethoxylate and 0.12% dodecyldimethylammonium chloride. After impregnating and allowing them to drip, the strips were dried in air or on drying racks. The resulting strips were no longer flammable and they also would not smoulder after the ignition source had been removed. The carbonization process was also greatly delayed in comparison with materials treated by other methods.

The final $Al_2O_3$ content in the product was 2.2%.

To shorten the drying time and improve the penetration of solution into the wood structure, it is also possible to work under pressure in conventional high-pressure impregnation installations.

EXAMPLE 9

Fiber Insulation Material by Foaming 100 g of a mixture of 23.5 g waste cellulose, 27 g calcium carbonate, 4 g silicon dioxide, 3 g aluminum oxide, 1 g iron(III) oxide, 5 g magnesium carbonate, 0.2 g dodecyldimethylammonium chloride, 1 g sodium tetraborate, 0.01 g of a sparingly soluble copper compound and 5 g calcium hydroxide were prepared with 33.9 mL water. This starting material could be handled and transported easily.

This starting mixture was mixed thoroughly with 40 mL more water in a mixing drum, then optionally mixed with 1 g nonionic surfactant and foamed with 10 mL hydrogen peroxide. The foam was mixed well for ten seconds more and then applied to flat drying racks shortly before the evolution of gas subsided, thus permitting drying from above and below. The water-based foam was then dried at 80° C. The dehydrated product was pulverized in a water mill and then obtained as a finely divided, fibrous product which was then blown into a wall cavity 24 cm thick. After completely filling the cavity and compressing slightly to approximately 300 g/dm³, a thermal conductivity of 0.06 W/mK was obtained.

EXAMPLE 10

Fiber Insulation Material by Dry Finishing 1000 g of a mixture of 235 g waste cellulose, 270 g calcium carbonate, 40 g silicon dioxide, 3 g aluminum oxide, 1 g iron(III) oxide, 50 g magnesium carbonate, 2 g dodecyldimethylammonium chloride, 10 g sodium tetraborate, 0.1 g of a sparingly soluble copper compound and 50 g calcium hydroxide were prepared by mixing with 339 mL water. This starting material corresponds to the mixture used in Example 1.

The starting mixture was also moistened with 100 mL of a solution containing 2% dodecyldimethylammonium chloride and 2% N,N-bis-(3-aminopropyl)-N-dodecylamine, pulverized in a blade mill and homogenized and then mixed with 100 g cement in a mixing drum, yielding a finely divided fibrous product having a much higher bulk density than the material prepared in Example 1.

To bind the cement, the product was stored for 48 hours at room temperature in the presence of air and could then be blown into a wall cavity 12 cm thick without pulverizing again. After completely filling the cavity, a density of approximately 720 g/dm³ was found without any additional compressing, and a thermal conductivity of 0.04 W/mK was measured.

EXAMPLE 11

Insulation Material by Dry Finishing and Granulation 1000 g of a mixture of 235 g waste cellulose, 270 g calcium carbonate, 40 g silicon dioxide, 3 g aluminum oxide, 1 g iron(III) oxide, 50 g magnesium carbonate, 2 g dodecyldimethylammonium chloride, 10 g sodium tetraborate, 0.1 g of a sparingly soluble copper compound and 50 g calcium hydroxide were prepared by mixing with 339 mL water. This starting material corresponds to the mixture used in Example 1.

This starting mixture was coarsely preground in a blade mill while still moist, mixed with 419 g cement in a mixing drum and then mixed with 410 mL water, yielding a coarse-grained, granular product which could be introduced as a loose packing into hollow walls but could also be used for footfall insulation and thermal insulation in floors.

To bind the cement, the product was stored for at least 48 hours at room temperature in the presence of air and could then be blown into a wall cavity 12 cm thick without being processed further. After completely filling the cavity, a density of approximately 720 g/dm³ was found without any additional compression, and a thermal conductivity of 0.04 W/mK was measured.

EXAMPLE 12

Molded Articles Made of Filled Waste Cellulose by Foaming and then Molding 2700 g of a mixture of 634.5 g waste cellulose, 729 g calcium carbonate, 108 g silicon dioxide, 8.1 g aluminum oxide, 2.7 g iron(III) oxide, 135 g magnesium carbonate, 5.4 g dodecyldimethylammonium chloride, 27 g sodium tetraborate, 0.3 g of a sparingly soluble copper compound and 135 g calcium hydroxide were prepared by mixing with 915 mL water. This starting material corresponds to the mixture used in Example 1.

This starting mixture was mixed thoroughly with 40 mL more water in a mixing drum, optionally mixed with 1 g nonionic surfactant and foamed with 100 mL hydrogen peroxide. The foam was mixed well for approximately 10 seconds more and then transferred to a mold before the evolution of gas stopped, and compressed at a pressure of 150 kg/m³ (D=600 g/dm³). The molded articles with dimensions 300×300×50 mm (width×length×height) were placed on flat drying racks which permitted uniform airing on all sides, and then dried at 80° C. After completely lining a wall with a 50 mm thick board, a thermal conductivity of 0.07 W/mK was determined. The boards could be attached by gluing or by means of strips using the traditional technology (mineral fiber boards).

EXAMPLE 13

Fiber Insulation Material by Milling 2700 g of a mixture of 1634.5 g waste cellulose, 675 g calcium carbonate, 108 g silicon dioxide, 8.1 g aluminum oxide, 2.7 g iron(III) oxide, 135 g magnesium carbonate, 5.4 g dodecyldimethylammonium chloride, 0.3 g of a sparingly soluble copper compound were prepared by mixing with 131.5 mL water.

This starting mixture was wetted thoroughly in a mixing drum with 300 mL of a 10% solution of technical grade aluminum hydroxychloride in water and then with 300 mL of a 1% tetradecylthiuronium bromide solution (water:isopropanol=2:1). After a treatment time of approximately ten minutes, the moist granular product was shredded in a high-speed beater and cutter mill and dried on drying racks at 80° C. The product was obtained as a finely divided, fibrous product which was then blown into a wall cavity 24 cm thick. After completely filling the cavity and slightly compacting to approximately 200 g/dm$^3$, a thermal conductivity of 0.05 W/mK was determined.

What is claimed is:

1. A nonflammable fiber product, comprising:
   30 to 97 wt % of a cellulose-based fiber or a cellulose-based fiber mixture;
   0.01 to 1 wt % of a nonionic surfactant and
   1 to 5 wt % aluminum oxide distributed finely in and on the fiber.

2. A fiber product according to claim 1, wherein it contains 0.005 to 0.5 wt % of a biologically active surface-active ingredient.

3. A fiber product according to claim 1, wherein it also contains a binder.

4. A fiber product according to one of claims 1 through 3, wherein the cellulose-based fibers or the fiber mixture is/are selected from cellulose, lignin-containing wood structures and compact wood, wood chips or wood pulp, bark, straw, flax, hemp, jute, cotton, coconut, recycled paper, other cellulose-based waste products and mixtures thereof.

5. A fiber product according to claim 2, wherein the biologically active surface-active ingredient is a cationic surfactant or a sparingly water-soluble cationic surfactant or a mixture thereof.

6. A fiber product according to claim 3, wherein it is in the form of a board.

7. A fiber product according to claim 2, comprising:
   30 to 70 wt % cellulose fibers;
   15 to 45 wt % calcium carbonate;
   0.01 to 1 wt % cationic surfactant;
   0.05 to 1 wt % biologically active, sparingly water-soluble surface-active ingredient or 0.25 to 6.5 wt % calcium peroxide; the remainder consisting of fillers;
   plus optionally one or more additional biocidal agents.

8. A fiber product according to claim 7, comprising
   30 to 70 wt % cellulose fibers;
   15 to 45 wt % calcium carbonate;
   0.01 to 1 wt % cationic surfactant;
   5 to 35 wt % cement;
   the remainder consisting of fillers from the group consisting of $Al_2O_3$, $SiO_2$, MgO, calcium silicates and alumino silicates, $BaSO_4$, $Na_2CO_3$, KCl, $K_2CO_3$, CaF, iron oxides and mixtures thereof; and optionally one or more other biocidal agents.

9. A fiber product according to claim 1, wherein the filler is selected from the group consisting of $Al_2O_3$, $SiO_2$, MgO, calcium silicates and alumino silicates, $BaSO_4$, $Na_2CO_3$, KCl, $K_2CO_3$, CaF, iron oxides and mixtures thereof.

10. A fiber product according to claim 1, wherein the nonionic surfactant is a fatty alcohol ethoxylate, an alkyl phenyl ethoxylate, a fatty amine ethoxylate, a fatty acid ester ethoxylate or a mixture thereof, in particular a fatty alcohol ethoxylate of $C_{16}/C_{18}$ alcohols with 16 to 20 ethoxy units.

11. A process for producing a nonflammable fiber product wherein an aqueous 1 to 15 wt % solution of aluminum hydroxychloride containing 0.05 to 1 wt % of a nonionic surfactant is applied to a cellulose-based fiber or a cellulose-based fiber mixture by a mixing, impregnating, dipping or spraying method and then drying, with the fiber product also contains 0 to 68 wt % of a filler or a filler mixture, based on the total weight, in addition to 30 to 97 wt % fibers.

12. A fiber product according to claim 1 as a blowable and nonflammable or non-smouldering thermal insulation material.

13. A fiber product according to claim 1 for producing flame-retardant and thermally insulating molded articles.

14. A fiber product according to claim 1, wherein it contains 0 to 68 wt % fillers.

* * * * *